(12) United States Patent
Arcella et al.

(10) Patent No.: US 8,133,927 B2
(45) Date of Patent: Mar. 13, 2012

(54) COMPOSITE IONOMERIC MEMBRANE

(75) Inventors: Vincenzo Arcella, Milan (IT); Paola Vaccarono, Milan (IT); Alessandro Ghielmi, Milan (IT)

(73) Assignee: Solvay Solexis S.p.A., Milan (IT)

( * ) Notice: Subject to any disclaimer, the term of this patent is extended or adjusted under 35 U.S.C. 154(b) by 1458 days.

(21) Appl. No.: 11/375,593

(22) Filed: Mar. 15, 2006

(65) Prior Publication Data

US 2007/0066691 A1    Mar. 22, 2007

(30) Foreign Application Priority Data

Mar. 17, 2005    (IT) .............................. MI2005A0445

(51) Int. Cl.
*C08J 5/20*      (2006.01)
(52) U.S. Cl. ........... 521/27; 526/249; 526/250; 526/255
(58) Field of Classification Search .................... 521/27; 526/249, 250, 255
See application file for complete search history.

(56) References Cited

U.S. PATENT DOCUMENTS

| | | | |
|---|---|---|---|
| 2,242,218 A | 5/1941 | Auer | |
| 3,560,568 A | 2/1971 | Resnick et al. | |
| 3,665,041 A | 5/1972 | Sianesi et al. | |
| 3,715,378 A | 2/1973 | Sianesi et al. | |
| 3,810,874 A | 5/1974 | Mitsch et al. | |
| 4,297,194 A | 10/1981 | Dotson et al. | |
| 4,358,545 A | 11/1982 | Ezzell et al. | |
| 4,433,082 A * | 2/1984 | Grot | 524/544 |
| 4,940,525 A * | 7/1990 | Ezzell et al. | 204/252 |
| 5,082,472 A * | 1/1992 | Mallouk et al. | 95/49 |
| 5,173,553 A | 12/1992 | Albano et al. | |
| 5,547,551 A | 8/1996 | Bahar et al. | |
| 2004/0158014 A1 * | 8/2004 | Wlassics et al. | 526/252 |
| 2006/0223894 A1 * | 10/2006 | Ghielmi et al. | 521/27 |

FOREIGN PATENT DOCUMENTS

| | | |
|---|---|---|
| EP | 0 148 482 A2 | 7/1985 |
| EP | 0 239 123 A2 | 9/1987 |
| EP | 0 289 869 A2 | 11/1988 |
| EP | 1 004 615 A2 | 5/2000 |
| EP | 1238999 A1 * | 9/2002 |
| EP | 1285688 A1 * | 2/2003 |
| EP | 1702668 A1 * | 9/2006 |
| EP | 1702670 A1 * | 9/2006 |

* cited by examiner

*Primary Examiner* — Peter D. Mulcahy
*Assistant Examiner* — Henry Hu
(74) *Attorney, Agent, or Firm* — Arent Fox LLP

(57) ABSTRACT

A composite ionomeric membrane comprising a layer or film of a porous inert material on which a (per) fluorinated sulphonic ionomer is deposited wherein the sulphonic groups are at the end of short side chains (SSC), said ionomer having:
    equivalent weight comprised between 280 and 1,700 g/eq;
    side chains of formula: $-O-CF_2-CF_2-SO_3-M^+$, wherein M is hydrogen or an alkaline metal;
said membrane having in each of the two orthogonal directions xy of the plane, after dipping in demineralized water at 100° C. for 30 minutes and preliminary drying at 105° C. under vacuum for one hour, the following size variations:
    in one direction, size variation lower than 25%;
    in the other direction, size variation lower than 20%.

7 Claims, No Drawings

COMPOSITE IONOMERIC MEMBRANE

This nonprovisional application claims the benefit of Italian Application No. MI2005 A 000445, filed Mar. 17, 2005. The disclosure of the prior application is hearby incorporated herein in it's entirety by reference.

The present invention relates to composite membranes to be used in electrochemical cells, preferably fuel cells, comprising (per) fluorinated ionomers where the sulphonic groups are at the end of short side chains (SSC), and having reduced size variations in the two orthogonal directions xy in the plane, lower than 25%, preferably lower than 20%, combined with good mechanical properties.

Composite ionomeric membrane means an ionomeric membrane containing at least an inner layer of inert porous tissue acting as a reinforcement, obtainable for example by impregnation of said layer with the ionomer.

Inert support means a support substantially maintaining chemically and physically unaltered under the conditions used for preparing the membrane.

The (per) fluorinated polymers having short side chain (SSC) ending with a sulphonyl group or acid sulphonic, or in salified form are known in the prior art. See for example U.S. Pat. Nos. 4,358,545 and 4,940,525. The side chains of said (per) fluorinated polymers have general formula:

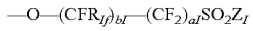

wherein:
   $Z_I$ can have various meanings, among them halogen;
   aI and bI are integer numbers ranging from 0 to 2, with the proviso that aI+bI is different from zero;
   $R_{fI}$ is selected from F, Cl, $C_1$-$C_{10}$ perfluoroalkyl or chlorofluoroalkyl.

See U.S. Pat. No. 4,940,525. When $Z_I$ is halogen, for example fluorine, the —$SO_2$F groups are convertible into —$SO_3$H groups by hydrolysis.

The composite membranes are known in the prior art. In U.S. Pat. No. 4,433,082, see in particular Example 5, composite membranes are obtained by impregnation with a solution of an ionomer copolymer TFE/perfluoro (3,6-dioxa-4-methyl-7-octensulphonyl fluoride) having equivalent weight 1,100 of various porous supports, among which foamed PTFE (GoreTex®). The method used in this patent to obtain the membranes consists in gradually heating the impregnated support up to temperatures in the range 50° C.-75° C. Nothing is said as to the size variations of these membranes. U.S. Pat. No. 5,547,551 describes ultrathin composite membranes formed by an ionomer (ion exchange material) impregnating a microporous structure characterized by knots interconnected by fibrils, or substantially by fibrils. The preferred material used in the microporous structure is foamed polytetrafluoro-ethylene. The obtained composite membranes have a thickness lower than 0.025 mm, and are substantially occluded to gases (Gurley number higher than 10,000 seconds). The Examples of this patent illustrate the preparation of composite membranes, wherein as ionomer a polymer TFE/perfluorosulphonic acid having equivalent weight 1,100 is used, at 5% in hydroalcoholic solution, known with the commercial name Nafion®. The support is foamed PTFE. According to the process described in the Examples, the impregnation is carried out by fixing the foamed PTFE to a frame and then, by using known coating techniques in the field, by applying to the foamed PTFE the Nafion® solution. The impregnation is repeated until the membrane substantially results occluded to gases. Nothing is said as to the size variations of these membranes.

The ionomer used in the Examples of this patent has side chains having general formula:

wherein $R^A$=F, $C_1$-$C_{10}$ perfluoroalkyl; Y=F, $CF_3$; ma=1, 2 or 3.

See for example U.S. Pat. No. 4,297,194.

Tests carried out by the Applicant have shown that, when sulphonic short side chains (SSC) ionomers as above defined are used, in the process described in U.S. Pat. No. 5,547,551 composite membranes having high size variations are obtained, higher than 30% in one of the two orthogonal directions xy of the plane, said size variations being measured after dipping the ionomeric composite membrane having a circular form with a diameter of 12 cm, dried at 105° C. under vacuum for one hour, in demineralized water at 100° C. for 30 minutes.

This represents a drawback for applications in fuel cell. It is indeed known that membranes, having high size variations, have a reduced duration due to easy breaks during the operating cycles.

The need was felt to have available a composite membrane comprising (per)fluorinated ionomers with sulphonic groups at the end of short side chains (SSC) with reduced size variations, lower than 25% in the two orthogonal directions xy of the plane, preferably lower than 20%, combined with good mechanical properties.

The Applicant has found a composite ionomeric membrane solving the above technical problem.

An object of the present invention is a composite ionomeric membrane comprising a layer or film of a porous inert support on which a (per) fluorinated sulphonic ionomer is deposited wherein the sulphonic groups are at the end of short side chains (SSC), the ionomer having:
   equivalent weight from 380 to 1,700 g/eq, preferably from 500 to 1,200 g/eq;
   side chains of formula: —O—$CF_2$—$CF_2$—$SO_3^-M^+$, wherein M is hydrogen or an alkaline metal;
said membrane having a circular form with a diameter of 12 cm, after drying at 105° C. under vacuum for one hour and subsequent dipping in demineralized water at 100° C. for 30 minutes, having in both the orthogonal directions xy of the plane size variations lower than 25%.

Preferably the membrane subjected to the above test, shows the following size variations:
   in one of the two orthogonal directions the size variation is lower than 25%, preferably lower than 20%;
   in the other direction the size variation is lower than 20%.

The membranes of the present invention are obtainable with the process indicated hereunder.

The (per) fluorinated ionomers usable for preparing the composite membranes of the present invention are obtainable from ionomers having the following units:
(A) monomeric units deriving from one or more fluorinated monomers containing at least one ethylenic unsaturation;
(B) fluorinated monomeric units containing —$SO_2$F groups having formula $CF_2$=CF—O—$CF_2CF_2SO_2$F, in amounts such that the ionomer has the equivalent weight in the above range;
by hydrolysis of the —$SO_2$F groups to obtain the —$SO_3$H groups. The fluorinated monomers (A) are selected from:
   vinylidene fluoride (VDF);
   $C_2$-$C_8$ perfluoroolefins, preferably tetrafluoroethylene (TFE);
   $C_2$-$C_8$ chloro- and/or bromo- and/or iodo-fluoroolefins, as chlorotrifluoroethylene (CTFE) and bromotrifluoroethylene;

$CF_2=CFOR_{f1}$ (per) fluoroalkylvinylethers (PAVE), wherein $R_{f1}$ is a $C_1$-$C_6$ (per) fluoroalkyl, for example trifluoromethyl, bromodifluoromethyl, pentafluoropropyl;

$CF_2=CFOX$ perfluoro-oxyalkylvinylethers; wherein X is a $C_1$-$C_{12}$ perfluoro-oxyalkyl having one or more ether groups, for example perfluoro-2-propoxy-propyl.

Optionally the sulphonic fluorinated ionomers of the invention can contain from 0.01% to 2% by moles of monomeric units deriving from a bis-olefin of formula:

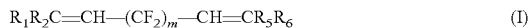

wherein:
m=2-10, preferably 4-8;
$R_1$, $R_2$, $R_5$, $R_6$, equal to or different from each other, are H or $C_1$-$C_5$ alkyl groups.

Preferably the ionomers of the membrane of the present invention contain TFE as monomer (A).

The hydrolysis treatment of the ionomers containing the precursor groups of the sulphonic groups comprises two steps; the first is carried out in basic environment and the second in acid environment, obtaining the ionomers with functional groups in the acid form —$SO_3H$.

The sulphonyl precursor groups —$SO_2F$ are transformed into sulphonic groups —$SO_3H$ by the following steps:
salification of the —$SO_2F$ form into the —$SO_3^-Me^+$ form, where Me is an alkaline metal;
acidification of the —$SO_3^-Me^+$ form into the —$SO_3H$ form.

The first step can for example be carried out by mixing the ionomeric polymer with an aqueous solution containing 10% by weight of KOH, at a temperature between 60° C. and 80° C., for a time higher than 2 hours, until disappearance of the —$SO_2F$ groups (IR analysis) and formation of the —$SO_3^-Me^+$ group. At the end of the salification step the ionomer is washed with water at a temperature preferably not higher than 25° C. The acidification step is carried out, for example, by transferring the salified ionomer into a aqueous solution containing 20% by weight of HCl at room temperature and by keeping under stirring for at least half an hour. At the end a washing with water is carried out according to the above method.

Monomer (B) can be prepared according to the process described in U.S. Pat. No. 3,560,568.

The membranes according to the present invention have a thickness ranging from 5 micrometers to 2,000 micrometers, preferably from 10 to 150 micrometers.

A further object of the present invention is a process for preparing the composite membrane of the present invention, comprising the following steps:
1) preparation of a liquid dispersion comprising a (per) fluorinated ionomer as defined above, in acid or salified form, wherein the ionomer concentration is, in percent by weight, between 0.5% and 40%, preferably between 0.5% and 25%;
2) deposit of the dispersion obtained in 1) on the surfaces of a porous support to form a film or layer, removal of the dispersion in excess, preferably by dripping, obtaining a film of impregnated porous inert material;
3) application on one side of the film or layer of the impregnated porous inert material of a support of a material preferably non porous and with smooth surfaces, inert under the conditions used in step 4) of thermal treatment of the process of the present invention;
3a) optional removal of the solvent from the film or layer of the impregnated porous inert material positioned on the support;
4) annealing at temperatures from 130° to 280° C., preferably from 140° to 180° C., obtaining a membrane on a support;
5) detachment of the membrane from the support.

In step 1) preparation of a liquid dispersion comprising a (per) fluorinated ionomer, the solvent is selected from $C_1$-$C_3$, preferably $C_3$, alcohols, n-propanol and/or iso-propanol; or from mixtures, preferably with water, of said $C_1$-$C_3$ alcohols. During the preparation other organic solvents can optionally be used, in addition to those indicated above, provided that they are miscible with water and/or with the above alcohols. Examples of said optional solvents are the following: dimethyl sulphoxide (DMSO), ethylen glycol (EG), N,N'-dimethylformamide (DMF), triethyl phosphate (TEP), 2-ethoxyethanol (2EE), N,N'-dimethylacetamide (DMA), N-methylpyrrolidone (NMP), acetonitrile (AN) and propylencarbonate (PC), fluoropolyoxyalkenes having one hydrogen atom at one or at both the chain ends; the fluoropolyoxyalkenes preferably have boiling point between 80° C. and 120° C.

The ionomer in solutions and/or dispersions are known in the prior art. See for example EP 1,004,615 and U.S. Pat. No. 4,433,082.

In step 2) the deposit of the ionomeric dispersion prepared in step 1) on the surfaces of the porous material film can be contemporaneously carried out or it can be carried out separately on each surface.

In step 2) the film or porous layer can be formed of any inert material. Preferably a porous support based on (per) fluoropolymers is used due to their high chemical resistance. Still more preferably porous PTFE, preferably bistretched, is used. The film or layer of inert porous material can also be available in the form of a porous tissue, or of a polymeric net.

In step 2) the deposit of the polymer in solution or dispersion is carried out with the known methods of the prior art; for example it can be carried out by brush coating, dip coating, spray coating, casting with knife, kiss-coating, serigraphy, ink-jetting, curtain coating, etc. Preferably the dip coating is used.

In step 3 the inert support can be any continuous support, i.e., non porous, preferably with smooth surfaces, with size variations in each of the two orthogonal directions xy of the plane, measured at the temperature of step 4) for 15 minutes, not higher than 2%, preferably lower than 1%. Preferably the support shows mechanical properties substantially unchanged during the thermal treatment of the process. For example the inert support can be formed of one of the following materials: non porous PTFE, polyimide, in particular marketed with the trademark Kapton®, MFA, PFA, polyesters such as PET.

The thermal treatment in step 4) is carried out for a time generally higher than 15 minutes and preferably lower than 10 hours. Generally the higher the temperature, the lower the treatment times.

In step 5) the detachment of the membrane from the support is carried out with the methods known in the prior art, for example by dry operating, or by dipping in water, generally at room temperature (25° C.).

The preparation of the ionomers used for preparing the membranes of the present invention can be carried out by a mass, suspension, emulsion radical polymerization process. The aqueous emulsion or microemulsion polymerization can for example be mentioned. The surfactants usable in these polymerizations are (per)fluorinated, for example salts (as defined below) of the perfluorooctanoic, perfluorononanoic, perfluorodecanoic acid, or their mixtures, etc., (per)fluoropolyethers with an acid end group (for example COOH, $SO_3H$), salified with $NH_4^+$ or with alkaline metal cations, the other end group being (per)fluorinated, optionally containing one H or Cl atom. The number average molecular weights of the perfluoropolyether surfactants generally range from 300 to 1,800, preferably from 350 to 750.

The microemulsion polymerization is well known in the art.

In particular the ionomer preparation is carried out by using an aqueous emulsion wherein, in the reaction medium, as surfactants, those of formula:

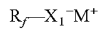

are used, wherein:
X$_1$ is equal to —COO, —SO$_3$;
M is selected from H, NH$_4$ or an alkaline metal;
R$_f$ represents a (per)fluoropolyether chain, preferably having number average molecular weight in the range from about 230 to about 1,800, preferably from 300 to 750, said (per)fluoropolyether chain comprising repeating units selected from one or more of the following:
a) —(C$_3$F$_6$O)—;
b) —(CF$_2$CF$_2$O)—;
c) —(CFL$_0$O)—, wherein L$_0$=—F, —CF$_3$;
d) —CF$_2$(CF$_2$)$_{z'}$CF$_2$O—, wherein z' is an integer 1 or 2;
e) —CH$_2$CF$_2$CF$_2$O—

R$_f$ is monofunctional and has a (per)fluorooxyalkyl end group T, for example CF$_3$O—, C$_2$F$_5$O—, C$_3$F$_7$O—; optionally in perfluoroalkyl end groups one fluorine atom can be substituted with one chlorine or hydrogen atom. Examples of these end groups are Cl(C$_3$F$_6$O)—, H(C$_3$F$_6$O)—. The unit a) C$_3$F$_6$O is —CF$_2$—CF(CF$_3$)O— or —CF(CF$_3$)CF$_2$O—.

The aqueous emulsion polymerization is well known in the art.

In the above formula R$_f$ preferably has one of the following structures:
1) T-(CF$_2$O)$_a$—(CF$_2$CF$_2$O)$_b$—CF$_2$—
b, a being integers,
with b/a between 0.3 and 10 when a is different from 0, extremes included, a being an integer different from 0;
2) T-(CF$_2$—(CF$_2$)$_{z'}$—CF$_2$O)$_{b'}$, —CF$_2$—
b' and z' being integers,
wherein z' is an integer equal to 1 or 2;
3) T-(C$_3$F$_6$O)$_r$—(C$_2$F$_4$O)$_b$—(CFL$_0$O)$_t$—CF$_2$—
r, b, t being integers
with r/b ranging from 0.5 to 2.0 when b is different from 0; (r+b)/t ranges from 10 to 30, when t is different from 0; a, b, b', r, t are integers, their sum is such that R$_f$ has the above values of number average molecular weight.

The compounds wherein R$_f$ has the following formula:

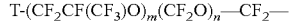

m, n being integers;
m/n ranges from 1 to 30;
wherein T=-OCF$_3$ or —OCF$_2$Cl,
are still more preferred.

The (per) fluoropolyethers R$_f$ are obtainable with the known processes of the prior art, see for example the following patents herein incorporated by reference: U.S. Pat. Nos. 3,665,041, 2,242,218, 3,715,378 and the European patent 239,123. The fluoropolyethers functionalized with hydroxyl termination are obtained for example according to EP 148,482, U.S. Pat. No. 3,810,874, from which the end functional groups are obtained with the processes indicated herein.

Chain transfer agents can be used in the polymerization. For example, alkaline or earth-alkaline metal iodides and/or bromides, according to U.S. Pat. No. 5,173,553. Chain transfer agents containing hydrogen, as hydrocarbons, alcohols, in particular ethyl acetate and ethane are preferably used.

The polymerization initiators used in the process of the present invention are preferably radical inorganic initiators, as for example ammonium and/or potassium and/or sodium persulphate, optionally in combination with ferrous, cuprous or silver salts. The procedures of the initiator feeding into the polymerization reactor can be in a continuous way or by a single addition at the beginning of the polymerization.

The polymerization reaction is generally carried out at temperatures in the range 25° C.-70° C., preferably 50° C.-60° C., under pressure up to 30 bar (3 MPa), preferably higher than 8 bar (0.8 MPa).

The monomer (B) is fed into the poylmerization reactor in a continuous way or by steps.

After the polymerization is completed, the ionomer is isolated by conventional methods, as the coagulation by addition of electrolytes or by freezing.

As said, the membranes of the present invention are usable in electrochemical cells, in particular in fuel cells.

The following Examples are given for illustrative and not limitative purposes of the present invention.

EXAMPLES

Characterization
Equivalent Weight Determination

About 1 gram of the polymer is dried at 150° C. for 40 h. From the dried powder a thin film of about 100 μm is obtained by molding in press at the temperature of 280° C. The so obtained film is treated at 80° C. for 24 h with KOH at 10% by weight, then washed with demineralized water and then treated at room temperature for 24 h with HCl at 20% by weight. At the end it is washed with demineralized water. In this way the sulphonyl groups of the film are converted into acid sulphonic groups.

The polymer film in acid form is dried at 105° C. up to a constant weight and weighed; then the film is suspended in a hydroalcoholic or an aqueous solution, an excess of a titrated NaOH solution is added and it is titrated back with a HCl titrated solution. The equivalent weight is determined by the ratio between the weight of the film, expressed in grams, and the number of equivalents of titrated acid groups.

Determination of the Size Variations of the Membrane in the Two Orthogonal Directions of the Plane The membrane is cut so as to obtain a square piece having 7×7 cm side.

The sizes of the membrane are determined after drying at 105° C. under vacuum for 1 hour. The membrane is then dipped in demineralized water at 100° C. for 30 minutes, at the end it is recovered and one determines how much the membrane has stretched in the two plane dimensions.

The size variations in the two orthogonal directions are calculated as percent referred to the starting sizes, after drying at 105° C. under vacuum for 1 hour.

Example 1

Ionomer Preparation in SO$_3$H Form having Equivalent Weight 870

In a 22 liter autoclave the following reactants are introduced:
11.5 liters of demineralized water;
980 g of the monomer of formula CF$_2$=CF—O—CF$_2$CF$_2$—SO$_2$F;

3,100 g of an aqueous solution at 5% by weight of a fluoropolyoxyalkylene having acid end group with number average molecular weight 521 potassium salified, of formula:

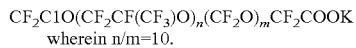
wherein n/m=10.

The autoclave, kept under stirring at 540 rpm, is heated to 60° C. Then 225 ml of an aqueous solution having a concentration of 6 g/l of potassium persulphate (KPS) are fed into the autoclave. The pressure is brought to 1.3 MPa absolute by introducing TFE. The reaction starts after 4 min. The pressure is maintained at 1.3 MPa absolute by feeding TFE. After 1,000 g of TFE have been fed into the reactor, 175 g of the sulphonic monomer of formula $CF_2=CF-O-CF_2-CF_2-SO_2F$ are introduced. Then 175 g of the same sulphonic monomer are introduced in the reactor every 200 g of TFE fed. The total TFE mass fed to the reactor is 4,000 g.

The reaction is stopped after 233 min by interrupting the TFE feeding, cooling and venting the reactor under vacuum. The produced latex has a solid content of 28.5% by weight. The latex is coagulated by freezing and defrosting, the polymer separated from the mother liquors, washed with water up to a constant pH of the washing waters.

The equivalent weight of the copolymer is 870 g/eq, corresponding to a composition 85.5% molar of TFE and 14.5% molar of sulphonic monomer.

A part of the polymer is separated from the washing waters and is treated with a 20% by weight KOH solution at 80° C. for 6 hours, by keeping under stirring. For one part by weight of polymer 10 parts by weight of KOH solution are charged. At the end it is washed with demineralized water up to stable pH of the washing waters. 10 parts by volume are added for one part by weight of polymer of a 20% HCl solution, maintaining under stirring at room T for 2 h. At the end it is washed with demineralized water up to stable pH of the washing waters. The addition steps of the HCl solution and of the subsequent washing with water are repeated for other two times. At the end the polymer in the $SO_3H$ form is recovered and dried for 40 h at 80° C.

Example 2

Preparation of the Ionomer Dispersion

A 12% by weight dispersion of the sulphonic ionomer obtained in the Example 1 is prepared by dissolving 27 g of ionomer in 200 g of a quaternary mixture composed of 39 g of $H_2O$, 80 g of isopropanol, 80 g of n-propanol and 1 g of a fluoropolyoxyalkylene having formula:

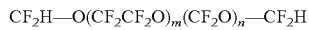

with boiling range between 80° C. and 120° C. and number average molecular weight equal to 350. The dissolution is carried out at room temperature in 24 hours in a glass vessel equipped with mechanical stirrer.

Example 3

Preparation of a Composite Membrane According to the Invention

A porous foamed PTFE specimen having a thickness of 35 µm and pores with mean diameter of 0.5 µm is fixed on a circular PTFE frame having a 12 cm diameter.

One side of the porous foamed PTFE is impregnated by pouring on the surface the dispersion prepared in the Example 2 and leaving into contact until the porous PTFE, which initially is white, becomes transparent. At this point the impregnation process on the considered side of the PTFE specimen is ended and the dispersion excess is removed.

The operation is repeated on the other side of the porous foamed PTFE by leaving into contact for the same time used in the former impregnation. At the end a raw composite transparent membrane is obtained. The thus obtained membrane has therefore a circular form with a diameter of 12 cm.

On one of the two sides of the raw membrane a polyamidoimide support (Kapton®) is applied and it is transferred into an oven at 80° C. for 30 minutes to remove the solvent, finally obtaining a composite transparent membrane dried on the support.

To consolidate the composite membrane, a final thermal treatment is carried out by transferring the membrane with the Kapton® support in a stove at 150° C. (annealing temperature) for 3 hours.

At the end of the treatment the composite membrane is detached from the support and from the frame by dipping in water.

Example 3a

Size Variations of the Composite Membrane of the Example 3

The composite membrane obtained in the Example 3 is subjected to the above described test to determine the size variations in the two orthogonal directions xy of the plane. At the end of the test it is found that the size variations in the two orthogonal directions are respectively 18% and 15%.

Example 4 (Comparative)

Preparation of a Membrane Impregnated According to the Prior Art

A porous foamed PTFE sample similar to that used in the Example 3 is fixed on a circular PTFE frame having a 12 cm diameter, fastened with 4 clamps.

One side of the porous foamed PTFE is impregnated by pouring on the surface the dispersion prepared in the Example 2 and leaving into contact until the porous PTFE, which initially is white, becomes transparent. At this point the impregnation on the considered side is ended and the dispersion excess is removed.

The operation is repeated on the other side of the porous foamed PTFE by leaving into contact for the same time used in the former impregnation, obtaining a raw composite membrane.

The impregnated PTFE placed on the frame is transferred into a stove at 80° C. for 30 minutes to remove the solvent. At the end of the treatment it is noted that the membrane remains transparent.

The subsequent consolidation of the membrane is carried out in a stove at 150° C. for 3 hours. At the end the membrane is detached from the frame.

Example 4a (Comparative)

Size Variations of the Composite Membrane Obtained in the Example 4 (Comparative)

The composite membrane obtained in the Example 4 (comparative) is subjected to the test to determine the size variations in the two orthogonal directions of the plane. It has been found that the size variations in the two orthogonal directions are respectively 33% and 23%.

The invention claimed is:

1. A composite ionomeric membrane comprising a layer or film of a porous inert material on which a sulphonic fluorinated ionomer is deposited, the sulphonic fluorinated ionomer comprising
  side chains of formula: —O—$CF_2$—$CF_2$—$SO_3$—$M^+$, wherein M is hydrogen or an alkaline metal,
  wherein the sulphonic fluorinated ionomer has an equivalent weight from 380 to 1,700 g/eq,
  wherein said composite ionomeric membrane, after drying at 105° C. under vacuum for one hour and subsequent dipping in demineralized water at 100° C. for 30 minutes, has size variations lower than 25% in both the orthogonal directions of the xy plane, and
  wherein the composite ionomeric membrane is prepared by a process comprising the following steps:
    1) preparing a liquid dispersion comprising a fluorinated ionomer in acid or salified form;
    2) depositing the dispersion on a surface of a porous inert material and removing excess dispersion to obtain a film or layer of impregnated porous inert material;
    3) applying a non-porous support that is inert under the process conditions to one side of the film or layer of impregnated porous inert material;
    4) annealing the film or layer of impregnated porous inert material and applied to the non-porous support at temperatures from 130° to 280° C.; and
    5) detaching the film or layer of impregnated porous inert material from the non-porous support.

2. The composite ionomeric membrane according to claim 1, wherein the size variation is lower than 20% in one of the two orthogonal directions.

3. The composite ionomeric membrane according to claim 1, wherein the sulfonic fluorinated ionomer usable for preparing the composite membranes of the present invention is obtained from ionomers having the following units:
  (A) monomeric units derived from one or more fluorinated monomers containing at least one ethylene unsaturation; and
  (B) fluorinated monomeric units containing —$SO_2F$ groups having formula $CF_2$=CF—O—$CF_2CF_2SO_2F$, in amounts such that the ionomer has the equivalent weight in the range of claim 1;
  by hydrolysis of the —$SO_2F$ groups to obtain the —$SO_3H$ groups.

4. The composite ionomeric membrane according to claim 3, wherein the fluorinated monomers (A) are selected from:
  vinylidene fluoride (VDF);
  $C_2$-$C_8$ perfluoroolefins;
  $C_2$-$C_8$ chloro- and/or bromo- and/or iodo-fluoroolefins;
  $CF_2$=CFOR$_{f1}$ (per) fluoroalkylvinylethers (PAVE), wherein R$_{f1}$ is a $C_1$-$C_6$ (per) fluoroalkyl;
  $CF_2$=CFOX perfluoro-oxyalkylvinylethers, wherein X is a $C_1$-$C_{12}$ perfluoro-oxyalkyl having one or more ether groups.

5. The composite ionomeric membrane according to claim 1, wherein the sulphonic fluorinated ionomer further comprises from 0.01% to 2% by moles of monomeric units deriving from a bis-olefin of formula:

$$R_1R_2C=CH-(CF_2)_m-CH=CR_5R_6 \quad (I)$$

wherein:
m=2-10;
$R_1$, $R_2$, $R_5$, $R_6$, equal to or different from each other, are H or $C_1$-$C_5$ alkyl groups.

6. The composite ionomeric membrane according to claim 3, wherein the ionomer contains TFE as monomer (A).

7. The composite ionomeric membrane according to claim 1, wherein the sulphonic fluorinated ionomer has an equivalent weight from 500 to 1,200 g/eq.

* * * * *